(12) United States Patent
Satorius

(10) Patent No.: US 6,321,005 B1
(45) Date of Patent: Nov. 20, 2001

(54) DEVICE FOR DISPERSION COMPENSATION USING TAPERED SINGLE-MODE OPTICAL FIBER

(75) Inventor: Duane A. Satorius, Silver Spring, MD (US)

(73) Assignee: The United States of America as represented by The National Security Agency, Washington, DC (US)

( * ) Notice: Subject to any disclaimer, the term of this patent is extended or adjusted under 35 U.S.C. 154(b) by 0 days.

(21) Appl. No.: 09/644,263

(22) Filed: Aug. 23, 2000

(51) Int. Cl.[7] ................................................. G02B 6/26
(52) U.S. Cl. .................... 385/28; 385/11; 385/27; 385/123
(58) Field of Search ................................. 385/11, 27, 28, 385/29, 43, 123

(56) References Cited

U.S. PATENT DOCUMENTS

| | | | |
|---|---|---|---|
| 4,678,267 | * 7/1987 | Burns et al. | 350/96.15 |
| 4,750,802 | 6/1988 | Bhagavatula . | |
| 5,035,480 | * 7/1991 | Dutt | 350/96.15 |
| 5,185,827 | 2/1993 | Poole . | |
| 5,261,016 | 11/1993 | Poole . | |
| 5,371,815 | 12/1994 | Poole . | |
| 5,420,948 | * 5/1995 | Byron | 385/37 |
| 5,448,674 | 9/1995 | Vengsarkar et al. . | |
| 5,473,719 | 12/1995 | Stone . | |
| 5,479,545 | * 12/1995 | Davenport et al. | 385/43 |
| 5,729,643 | * 3/1998 | Hmelar et al. | 385/43 |
| 5,818,987 | * 10/1998 | Bakhti et al. | 385/28 |
| 5,862,287 | 1/1999 | Stock et al. . | |
| 5,883,992 | * 3/1999 | Gonthier | 385/43 |
| 6,115,519 | * 9/2000 | Espindola et al. | 385/43 |

OTHER PUBLICATIONS

Craig D. Poole et. al., "Optical Fiber–Based Dispersion Compensation Using Higher Order Modes Near Cutoff", Journal of Lightwave Technology, vol. 12, No. 10, Oct. 1994, IEEE.

Timothy E. Dimmick, et al., "Narrow–Band Acousto–Optic Tunable Filter Fabricated From Highly Uniform Tapered Optical–Fiber", Proceeding of the Optical Fiber Conference 2000, Mar. 5, 2000, Baltimore, MD.

* cited by examiner

Primary Examiner—Akm E. Ullah
Assistant Examiner—Jennifer Doan
(74) Attorney, Agent, or Firm—Robert D. Morelli

(57) ABSTRACT

A device for compensating for dispersion that includes a single-mode optical fiber consisting of a core, and a cladding, where the fiber has five section, a first section of a user-definable length; a second section of a user-definable length that is tapered at a user-definable rate to a user-definable diameter; a third section of a user-definable length and user-definable cutoff wavelength that is of a diameter equal to that which the second section was tapered; a fourth section of a length equal to the length of the second section, where the fourth section is tapered at the same, but opposite, rate of taper as the second section to a diameter equal to the diameter of the first section; a fifth section of a length equal to the length of the first section, and where the fiber has a user-definable cutoff wavelength. In a second embodiment, two spatial-mode converters are included with the fiber. In a third embodiment, a core-block is induced in the fiber. In other embodiments, a polarizer and a polarization rotator are included in the previous embodiments.

9 Claims, 2 Drawing Sheets

DEVICE FOR DISPERSION COMPENSATION USING TAPERED SINGLE-MODE OPTICAL FIBER

FIELD OF THE INVENTION

The present invention relates, in general, to optical waveguides and, in particular, to optical waveguides having a non-linear property.

BACKGROUND OF THE INVENTION

Initially, optical fibers were used as single-channel devices for transmitting lightwave signals. However, demand for increased bandwidth has caused the development of techniques for using optical fiber as multi-channel devices. A pulse of a lightwave signal within a channel contains a narrow spectrum of wavelengths. An optical fiber may be such that different wavelengths of a pulse propagate at different rates. Different propagation rates cause a pulse to spread in time. The extent to which a pulse is spread determines how close the channels may be spaced during transmission and still be discernible as different pulses. The minimum spacing between channels in an optical fiber determines the maximum transmission bandwidth of the optical fiber. The spreading of a pulse is called dispersion. Dispersion may be caused by the characteristics of the fiber (i.e., the refractive index of the core and cladding, etc.). Such dispersion is called material dispersion. Dispersion may also be caused by the geometry of the fiber. This type of dispersion is called waveguide dispersion. The combination of material dispersion and waveguide dispersion is called chromatic dispersion and is the primary limiting factor on transmission bandwidth. Dispersion of a waveguide is often characterized as a curve on a graph, where the x-axis of the graph is in units of wavelength (e.g., nm), and where the y-axis is in units of magnitude (e.g., psec/nm/km). A dispersion curve may be such that each wavelength maps to the same magnitude of dispersion (i.e., a flat, or zero slope, curve) or each wavelength maps to a different dispersion magnitude. If each wavelength maps to a different dispersion magnitude then the curve may either slope upward from left to right (i.e., positive dispersion slope) or downward from left to right (i.e., negative dispersion slope).

If the dispersion magnitude of a waveguide is zero for every wavelength then no dispersion, or delay, will be added to any of the wavelengths of the optical signal propogating in the waveguide and the optical signal will emerge from the waveguide undistorted. Such an optical fiber is called a zero dispersion fiber. Such fibers are more expensive than other types of optical fiber (e.g., single-mode fiber). Also, it may be prohibitively expensive to replace existing non-zero dispersion fiber with zero-dispersion fiber.

Optical fiber that has a dispersion slope, either positive or negative, has one point at which dispersion magnitude is zero. This zero dispersion point is around 1310 nm for non-zero dispersion fiber. For the most inexpensive and ubiquitous optical fiber (i.e., single-mode fiber) the dispersion slope is positive.

If the dispersion slope of a waveguide is positive then each wavelength propagating in the waveguide will have a different amount of delay added thereto, where the amount of delay added is proportional to the wavelength. That is, a smaller amount of delay is added to the shorter of two wavelengths than to the longer of two wavelengths. Therefore, the longer of two wavelengths will propagate slower through the waveguide than the shorter wavelength. The signal emerging from the waveguide will be distorted (i.e., broadened in time) with respect to the signal that entered the waveguide. The longer of the two wavelength components will lag the shorter wavelength component. Since an optical fiber has a fixed upper limit on bandwidth, a broader signal takes up more bandwidth and, therefore, lowers the number of usable channels within the transmission bandwidth of a waveguide. The optical communication industry is always looking for ways to increase the transmission bandwidth of a waveguide.

If the dispersion slope of a waveguide is negative then each wavelength will have a different amount of delay added thereto, where the amount of delay added is inversely proportional to the wavelength. That is, a larger amount of delay is added to the shorter of two wavelengths than is added to the longer wavelength. Therefore, the shorter of the two wavelengths will propagate slower through the waveguide than the longer wavelength. The signal emerging from the waveguide will be distorted (i.e., broadened in time, but in an opposite sense than for positive dispersion) with respect to the signal that entered the waveguide. The shorter of the two wavelengths will lag the longer wavelength. This lowers the number of channels within the usable transmission bandwidth of a waveguide.

To optimize the transmission bandwidth of an optical signal through a waveguide, dispersion must be compensated for periodically. One device for compensating for dispersion includes a length of fiber with dispersion equal to a single-mode fiber but opposite in polarity. Such a fiber is called a dispersion compensated fiber (DCF). However, DCF may introduce non-linearities when used with single-mode fiber because DCF has a smaller core diameter than does a single-mode fiber. In practice, the dispersion of a DCF may not exactly cancel out the dispersion of a single-mode over a broad band of wavelengths. Also, there are higher losses of light in DCF than in single-mode fiber due to the smaller diameter core of the DCF.

Another method of compensating for dispersion is to use a fiber Bragg grating (FBG). A FBG is a short-period chirped grating that is photo-induced into an optical fiber. The FBG disperses wavelengths within one channel of a fiber by reflecting different wavelengths at different times (e.g., longer wavelengths sooner than shorter wavelengths or vice versa). By reflecting different wavelengths at different times, an equal magnitude, but opposite slope, of dispersion may be introduced into the fiber to compensate for the accumulated dispersion. However, a FBG is neither the least expensive nor the least labor intensive method of compensating for dispersion.

U.S. Pat. No. 4,750,802, entitled "OPTICAL FIBER DISPERSION COMPENSATOR"; and U.S. Pat. No. 5,473,719, entitled "OPTICAL DISPERSION COMPENSATOR," each disclose a device for compensating for dispersion that separates a dispersion-distorted optical signal into a plurality of wavelengths and then sends each of the plurality of wavelengths down a separate fiber. Each fiber is tuned to add an equal amount, but opposite polarity and opposite slope, of dispersion to a particular wavelength. The dispersion-compensated wavelengths are then recombined to recover the original undistorted optical signal. U.S. Pat. Nos. 4,750,802 and 5,473,719 each require an optical fiber for each wavelength of interest, whereas the present invention does not. Therefore, U.S. Pat. Nos. 4,750,802 and 5,473,719 would be more expensive to build than the present invention. Also, insertion losses are greater in a device that splits and recombines wavelengths as does U.S. Pat. Nos. 4,750,802 and 5,473,719 than in the present invention which does not so split and recombine wavelengths. U.S. Pat. Nos. 4,750, 802 and 5,473,719 are hereby incorporated by reference into the specification of the present invention.

A single-mode optical fiber consists of a glass core, a glass cladding around the core, and a plastic buffer coating around the cladding for mechanical strength. The core is doped with materials to obtain an index of refraction slightly greater than that of the cladding. The buffer coating is fabricated to obtain an index of refraction greater than that of the cladding. Lightwaves may be transmitted within the core with little loss of light.

The term single-mode optical fiber indicates that a lightwave is transmitted in a single way, or spatial mode, through the core of the optical fiber. With the buffer coating in place, any lightwave that escapes the core due to bending, or other means, enters the cladding and is absorbed by, and lost in, the buffer coating. If the buffer coating is removed, lightwaves may enter the cladding and may propagate in a number of ways, or spatial modes, through the uncoated cladding. The greater the angle of the lightwave entering the fiber the greater number of reflections per unit length the lightwave will be subjected to as it propagates in the fiber and the higher the spatial mode in which the lightwave travels. A spatial mode is characterized by the pattern created by the reflection, per unit length of fiber, of the lightwave. A lightwave in a high-order spatial mode experience a greater number of reflections, per unit length of fiber, than do lightwaves in a lower-order spatial mode. Typically, lightwaves propagate in the lowest-order spatial mode in the core of the fiber (i.e., LP(0,1)).

A device for causing lightwaves in one spatial mode, in either the core or cladding of a waveguide, to propagate in another spatial mode is called a spatial-mode converter. The geometry of the waveguide determines in which spatial mode a lightwave will propagate or, in other words, which spatial modes are supported by the waveguide. A lightwave that propagates in a waveguide may only be converted to a spatial mode that is supported by the waveguide. Examples of spatial-mode converters include gratings that are photo-induced into the waveguide, microbends physically-induced into the waveguide, and an acoustic flexural-wave device. The acoustic flexural-wave device generates an acoustic wave that flexes the waveguide and induces a grating in the waveguide. The induced grating may be used to convert a lightwave in one possible spatial mode to another possible spatial mode. The acoustic flexural-wave device includes a piezoelectric device and a glass cone attached, at its base, to the piezoelectric device. The tip of the cone is attached to the waveguide. A user-definable electrical signal is applied to the piezoelectric device to generate a user-definable acoustic flexural-wave. The frequency of the electrical signal determines in which higher-order spatial mode a wavelength of an optical signal will be converted and, thereafter, propagate.

U.S. Pat. No. 5,185,827, entitled "APPARATUS FOR COMPENSATING CHROMATIC DISPERSION IN OPTICAL FIBERS"; U.S. Pat. No. 5,261,016, entitled "CHROMATIC DISPERSION COMPENSATED OPTICAL FIBER COMMUNICATION SYSTEM"; and U.S. Pat. No. 5,371,815, entitled "LOW-LOSS DUAL-MODE OPTICAL FIBER COMPENSATORS"; and an article by Craig D. Poole et al, entitled "Optical Fiber-Based Dispersion Compensation Using Higher Order Modes Near Cutoff," published by the IEEE in the *Journal of Lightwave Technology*, Vol. 12, No. 10, October 1994, pp. 1746–1758, disclose the use of two-mode, or multi-mode, optical fiber to compensate for dispersion, that higher amounts of dispersion at either polarity may be generated by using high-order spatial modes near the cutoff wavelength of the optical fiber, and that a polarization controller and a polarization rotator may be used with a dispersion compensator. A two-mode fiber has one core that supports two spatial modes in the core, whereas a single-mode fiber has one core which only supports one spatial mode in the core. A multi-mode fiber has one core that supports multiple spatial modes within the core. The cutoff wavelength of an optical fiber is the wavelength below which a wavelength may propagate in a supported spatial mode in the fiber and above which a wavelength may not. The devices of these patents and article use two-mode, or multi-mode, optical fiber which is more expensive than single-mode fiber. Also, the devices of these patents and article use only the spatial modes of the core of the optical fiber whereas the present invention is not so limited. Furthermore, the devices of these patents and article introduce insertion losses when coupled to a single-mode fiber due to the coupling mismatch between these two types of fibers. Still further, the difference in the index of refraction between the core and the cladding of the devices of these patents and article is 2%. Such a difference in the index of refraction is much lower that the index of refraction generated in the present invention. Therefore, the devices of these patents and will use a greater length of fiber than would the present invention to generate an equal amount of dispersion magnitude. U.S. Pat. Nos. 5,185,827; 5,261,016; and 5,371,815 are hereby incorporated by reference into the specification of the present invention.

U.S. Pat. No. 5,448,674, entitled "ARTICLE COMPRISING A DISPERSION-COMPENSATING OPTICAL WAVEGUIDE," discloses a device for compensating for dispersion that uses a length of dispersion compensated fiber and spatial modes of a two-mode, or multi-mode, fiber. The present invention does not use two-mode or multi-mode fiber. U.S. Pat. No. 5,448,674 is hereby incorporated by reference into the specification of the present invention.

U.S. Pat. No. 5,862,287, entitled "APPARATUS AND METHOD FOR DELIVERY OF DISPERSION COMPENSATED ULTRASHORT OPTICAL PULSES WITH HIGH PEAK POWER," discloses a device for compensating for dispersion over a single-mode fiber that requires an ultrashort pulsed laser source, a pulse stretcher, and a pulse compressor. The device of U.S. Pat. No. 5,862,287 pre-compensates for the anticipated dispersion of the single-mode fiber. The dispersion introduced by the single-mode fiber compresses the stretched signal to recover the original non-dispersed signal. The present invention does not require an ultrashort pulsed laser source. U.S. Pat. No. 5,862,287 is hereby incorporated by reference into the specification of the present invention.

In an article by Timothy E. Dimmick et al., entitled "Narrow-band acousto-optic tunable filter fabrication from highly uniform tapered optical fiber," published in the *Proceedings of the Optical Fiber Conference* 2000, held Mar. 5–10, 2000, in Baltimore, Md., U.S.A., pp. FB4-2 through FB4-4, it is disclosed that high-order spatial modes may be created in a tapered fiber. However, the article does not disclose the present invention.

SUMMARY OF THE INVENTION

It is an object of the present invention to compensate for dispersion in a tapered single-mode optical fiber.

It is another object of the present invention to compensate for dispersion in a tapered single-mode optical fiber and a plurality of spatial-mode converters.

It is another object of the present invention to compensate for dispersion in a tapered single-mode optical fiber, a plurality of spatial-mode converters, a polarizer, and a polarization rotator.

The dispersion compensator of the present invention is a single-mode optical fiber consisting of a core and a cladding around the core, without a buffer coating around the cladding. The single-mode fiber is divided into five sections, where the geometries of the five sections determine the dispersion for which the present invention may compensate.

The first section of the dispersion compensator is a user-definable length of single-mode optical fiber without a buffer coating around the cladding.

The second section of the dispersion compensator is a user-definable length of single-mode fiber that immediately follows the first section and is tapered at a user-definable rate to a user-definable diameter.

The third section of the dispersion compensator is a user-definable length that immediately follows the second section and is the same diameter to which the second section was tapered.

The fourth section of the dispersion compensator, which is equal in length to the second section, immediately follows the third section, and is tapered at the same, but opposite, rate of the second section to the diameter of the first section.

The fifth section of the dispersion compensator, which is equal in length to the first section, follows the fourth section.

A second embodiment of the present invention includes a first spatial-mode converter and a second spatial-mode converter between which is connected the device described above.

A third embodiment of the present invention includes the device of the second embodiment, where a core-block is induced in the first section of the single-mode fiber of the dispersion compensator.

A fourth embodiment of the present invention includes a polarizer and a polarization rotator connected to the first dispersion compensator described above.

A fifth embodiment of the present invention includes a polarizer and a polarization rotator connected to the second embodiment described above.

A sixth embodiment of the present invention includes a polarizer and a polarization rotator connected to the third embodiment described above.

DETAILED DESCRIPTION

Figure 1:
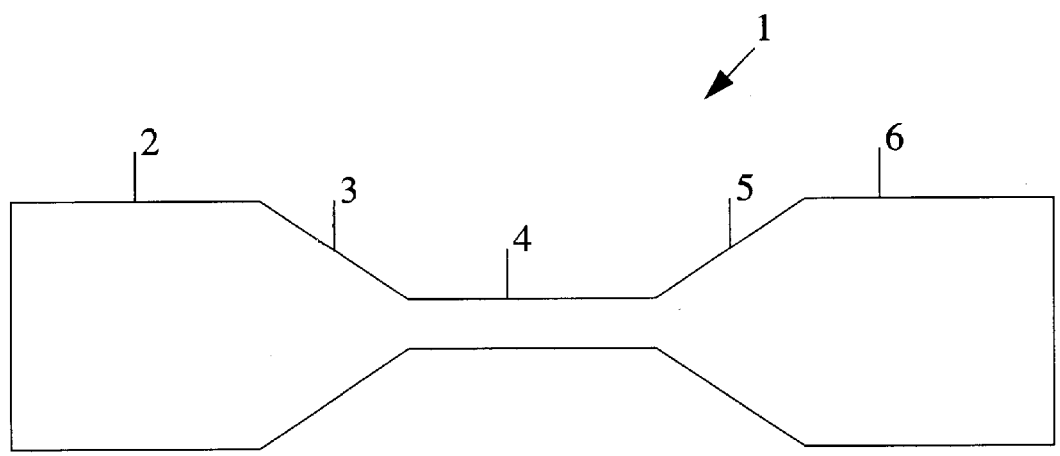
FIG. 1 is an illustration of a tapered single-mode fiber of the present invention.

FIG. 1 is an illustration of a first embodiment of a dispersion compensator 1 of the present invention. The figures of the present invention do not show the waveguide in which the present invention is inserted to compensate for dispersion accumulated in an optical signal propagating in the waveguide to the insertion point. The present invention may be inserted at a plurality of points in an optical transmission system. To compensate for all of the dispersion in an optical signal, the present invention must be inserted into an optical transmission system at a point where the dispersion accumulated in the optical signal is less than or equal to the maximum dispersion for which the present invention may compensate.

The dispersion compensator 1 is a single-mode optical fiber consisting of a core and a cladding around the core. The single-mode fiber of the dispersion compensator 1 is divided into five sections, where the geometry of each of the five sections of the single-mode fiber determines the dispersion for which the present invention may compensate. A buffer coating is not present on the single-mode fiber of the dispersion compensator 1 so that a lightwave may propagate in a higher-order spatial mode in the cladding. A higher-order spatial mode within the third section of the dispersion compensator 1 allows a greater magnitude of waveguide dispersion, with opposite polarity, to be generated. To compensate for dispersion accumulated in a lightwave, an equal magnitude of dispersion, at an opposite polarity, is generated and added to the lightwave. As the lightwave propagates along the dispersion compensator 1, the dispersion generated therein is added to the accumulated dispersion. If the two dispersions are equal in magnitude but opposite in sign then dispersion is totally removed from the lightwave.

When inserted into a single-mode fiber transmission system, the present invention does not introduce insertion losses as would the prior art because the fiber of the present invention matches such a transmission system whereas the prior art does not.

The first section 2 of the single-mode fiber of the dispersion compensator 1 is a user-definable length of single-mode optical fiber but without a buffer coating around the cladding. The first section 2 connects to, and receives an optical signal from, a waveguide (not shown). The dispersion compensator 1 must be tailored to compensate for the dispersion present in the received optical signal.

The second section 3 of the single-mode fiber of the dispersion compensator 1 is a user-definable length of single-mode fiber that immediately follows the first section 2 and is tapered at a user-definable rate to a user-definable diameter (e.g., 7 microns).

The third section 4 of the single-mode fiber of the dispersion compensator 1 is a user-definable length that immediately follows the second section 3 and is the same diameter to which the second section 3 was tapered. The third section 4 supports lower-order and higher-order spatial modes. The length and diameter of the third section 4 are two factors that determine the amount of waveguide dispersion for which the present invention may compensate. Other factors that affect the amount of dispersion for which the present invention may compensate include the index of refraction of the third section, the wavelength of the optical signal, and the difference in the index of refraction between the third section 4 and the surrounding media (e.g., air, fluid, etc.). All of these factors determine the cutoff wavelength of the third section 4. The closer a wavelength of an optical signal is to the cutoff wavelength of the waveguide the greater is the magnitude of the waveguide dispersion generated therein. Waveguide dispersion has negative magnitude and negative slope. Typically, a single-mode fiber transmission system introduces dispersion with a positive slope and a positive magnitude. Therefore, such dispersion may be compensated for by propagating the optical signal along an optical fiber that introduces dispersion of an equal magnitude but with an opposite polarity and an opposite slope.

The fourth section 5 of the single-mode fiber of the dispersion compensator 1, which is equal in length to the second section 3, immediately follows the third section 4, and is tapered at the same, but opposite, rate of the second section 3 to the diameter of the first section 2.

The fifth section 6 of the single-mode fiber of the dispersion compensator 1, which is equal in length to the first section 2, follows the fourth section 5. The lightwave exiting the fifth section 6 reenters the optical transmission system in which the present invention is inserted.

By selecting the index of refraction of the waveguide and the surrounding media, the length, and the diameter of the third section 4 of the dispersion compensator 1, a user may cause wavelengths of an optical signal propagating in spatial mode LP(0,1) in the core of the waveguide to be near the cutoff wavelength of the third section 4 of the dispersion compensator 1. Higher-order spatial modes, especially those near the cutoff wavelength of the waveguide, introduce larger amounts of dispersion, and with an opposite polarity, than the lower-order spatial modes of a single-mode optical transmission system in which the present invention is inserted. Since the polarity of the dispersion generated in a higher-order spatial mode may be of the opposite polarity to that of the dispersion in the optical signal as received then the dispersion in the optical signal may be cancelled, or compensated for, by adding the dispersion of the dispersion compensator 1 to the optical signal as it traverses the dispersion compensator 1.

By removing the buffer-coating of the single-mode fiber of the present invention and operating the single-mode fiber in air, a difference in index of refraction of approximately 26% may be obtained. The greater the difference in index of refraction the greater the magnitude of dispersion may be generated and the shorter the length of fiber required to generate a particular amount of dispersion. Since the present invention has a greater difference in index of refraction than the prior art, the dispersion compensator 1 of the present invention uses less fiber to generate the same amount of dispersion magnitude.

The fourth section 5 and the fifth section 6 of the single-mode fiber of the dispersion compensator 1 are identical to, but a mirror image of, the second section 3 and the first section 2, respectively. The fourth section 5 inverts the function of the second section 3. That is, the fourth section 5 causes the cutoff wavelength to be shifted back to where it was prior to the second section 3. The optical signal, for which its dispersion has been compensated, is then returned to propagating in the core-mode of the optical transmission system to which the present invention was inserted.

The index of refraction of the third section 4, or the media surrounding the third section 4, of the dispersion compensator 1 may be changed in any suitable manner (e.g., streching the fiber). Changing the index of refraction of the third section 4, or the media surrounding the third section 4, changes the cutoff wavelength of the dispersion compensator 1. Any suitable method of stretching the fiber may be used in the present invention. For example, fixing (e.g., glueing) two points of the dispersion compensator 1 and causing tension between the two fixed points.

Figure 2:
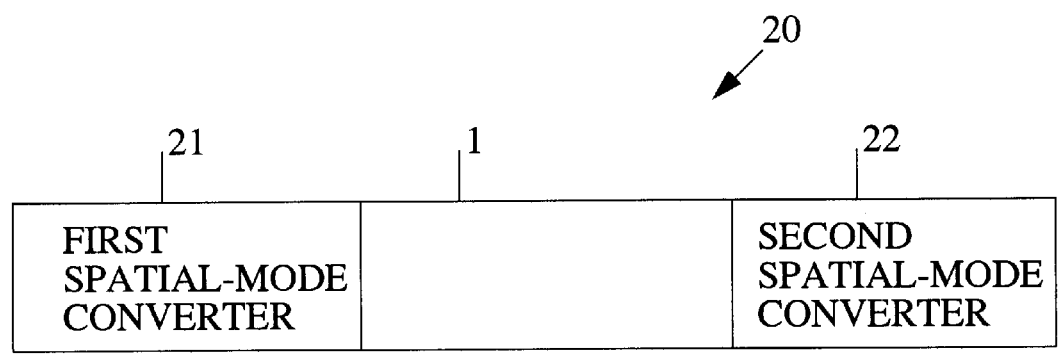
FIG. 2 is an illustration of the device of FIG. 1 with two spatial mode converters.

FIG. 2 is an illustration of a second embodiment 20 of the present invention. The second embodiment 20 includes a first spatial-mode converter 21 connected to the dispersion compensator 1 of FIG. 1. The dispersion compensator 1 is then connected to a second spatial-mode converter 22. The second embodiment 20 functions as does the dispersion compensator 1 of FIG. 1, but allows the second embodiment 20 to use a shorter single-mode fiber than the dispersion compensator 1 of FIG. 1. The reason for this is that the first spatial-mode converter 21 can convert an optical signal propagating in the core of the fiber to more higher-order spatial modes in the cladding than can the dispersion compensator 1 of FIG. 1. Higher-order spatial modes in the cladding have longer optical lengths. That is, light in a higher-order spatial mode in the cladding is reflected at sharper angles within the fiber and, therefore, travel a greater optical distance per unit length of the fiber than lower-order spatial modes. Therefore, a particular amount of dispersion may be obtained with a shorter length of fiber. The second spatial mode converter 22 undoes what the first spatial-mode converter 21 did by converting an optical signal propagating in a higher-order spatial mode in the cladding to an optical signal propagating in the one lower-order spatial mode (i.e., LP(0,1)) in the core of the fiber.

The first spatial-mode converter 21 and the second spatial-mode converter 22 are identical and may be realized by either an acoustic flexural-wave device attached to, or in-line with, the single-mode fiber of the present invention; a photo-induced grating impressed into the single-mode fiber; or microbending induced in the single-mode optical fiber. Any other suitable method of mode conversion may be employed in the present invention. An acoustic flexural-wave device requires an electrical signal to be applied thereto to cause the fiber to flex as desired by the user. The first spatial-mode converter 21 may cause the conversion of the optical signal to occur in either the first section 2 or the third section 4 of the single-mode fiber of the dispersion compensator 1.

Figure 3:
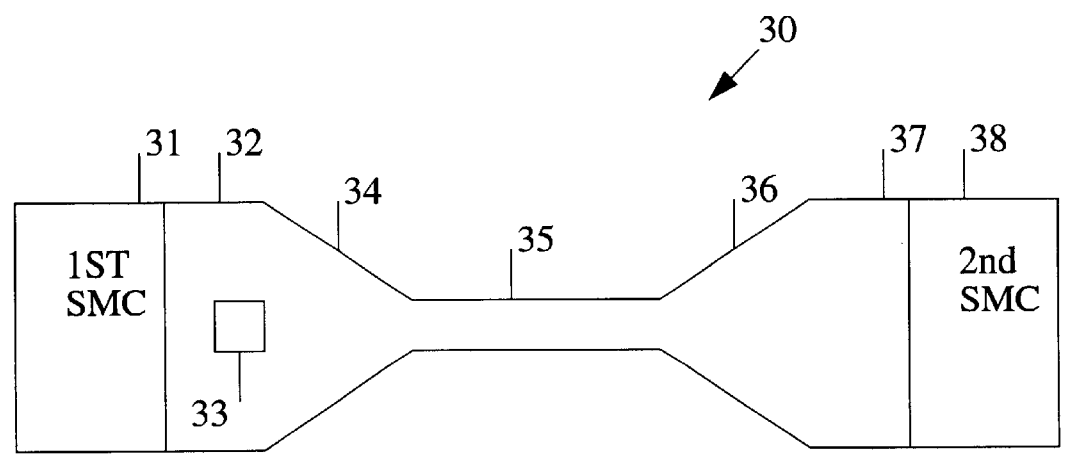
FIG. 3 is an illustration of the device of FIG. 2 with a core-block in the fiber.

FIG. 3 is an illustration of a third embodiment 30 of the present invention. The third embodiment 30 includes a first spatial-mode converter 31 connected to a single-mode fiber which is divided into five sections 32–37 consisting of a core and a cladding around the core. A buffer coating is not present on the single-mode fiber 32–37 so that a lightwave may propagate in a higher-order spatial mode in the cladding.

The first section 32 of the single-mode fiber is a user-definable length of single-mode optical fiber with a core-block 33 induced therein for eliminating undesired spatial modes in the single-mode fiber 32–37. A core-block 33 is used to reduce, or eliminate, interference from an unwanted spatial mode. A core-block 33 may be induced by physically breaking the core of the fiber, heating the core at a user-definable spot to melt the core in that area (e.g., using a laser), or by any other suitable means.

The second section 34 of the single-mode fiber is a user-definable length of single-mode fiber that immediately follows the first section 32 and is tapered at a user-definable rate to a user-definable diameter.

The third section 35 of the single-mode fiber is a user-definable length that immediately follows the second section 34 and is the same diameter to which the second section 34 was tapered. The diameter of the third section 35 must be uniform over its length to prevent any fluctuation in the dispersion induced therein.

The fourth section 36 of the single-mode fiber, which is equal in length to the second section 34, immediately follows the third section 35, and is tapered at the same, but opposite, rate of the second section 34 to the diameter of the first section 32.

The fifth section 37 of the single-mode fiber, which is equal in length to the first section 32, follows the fourth section 36.

The fifth section 37 is connected to a second spatial-mode converter 38.

Figure 4:
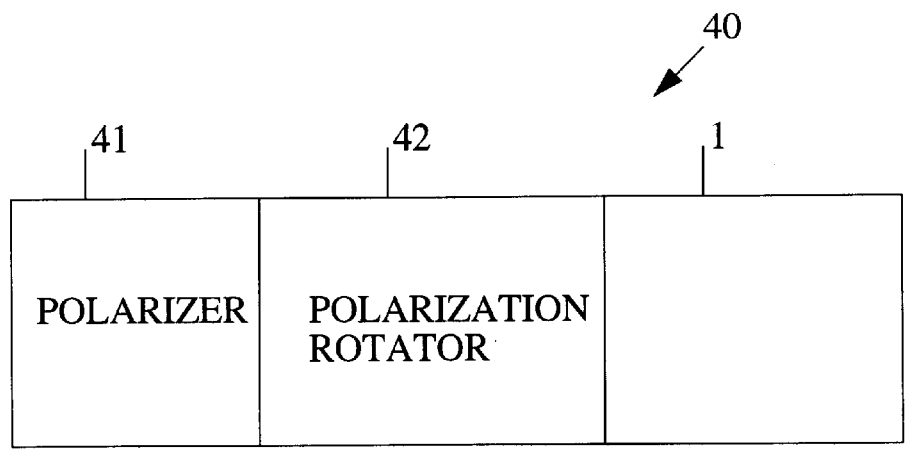
FIG. 4 is an illustration of the device of FIG. 1 with a polarizer and a polarization rotator.

FIG. 4 is a fourth embodiment 40 of the present invention. The fourth embodiment 40 includes a polarizer 41 connected to a polarization rotator 42. A lightwave propogating in a higher-order spatial cladding mode may be composed of multiple lightwaves of various polarizations propogating in multiple higher-order cladding modes. The polarizer 41 and the polarization rotator 42 insure that only a lightwave of a user-definable polarization propagates in a user-definable higher-order cladding mode. The polarization rotator 42 is connected to the dispersion compensator 1 of FIG. 1.

Figure 5:
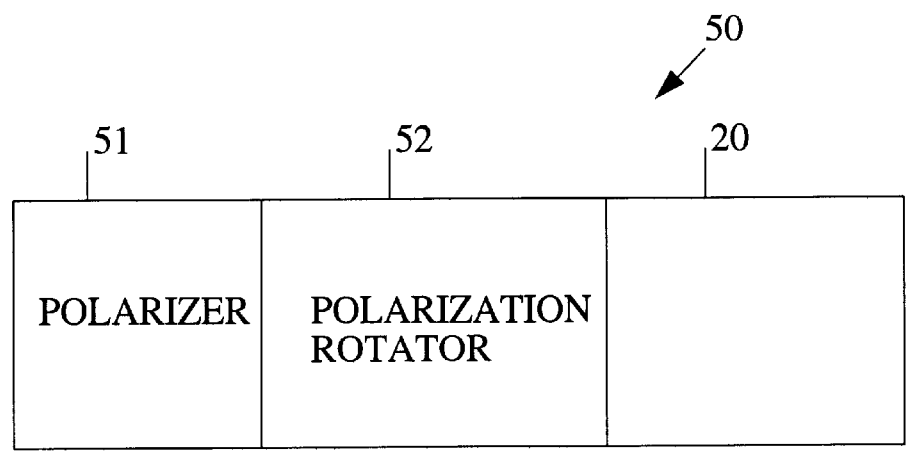
FIG. 5 is an illustration of the device of FIG. 2 with a polarizer and a polarization rotator.

FIG. 5 is a fifth embodiment 50 of the present invention. The fifth embodiment 50 includes a polarizer 51 connected to a polarization rotator 52. The polarization rotator 52 is connected to the dispersion compensator 20 of FIG. 2.

Figure 6:
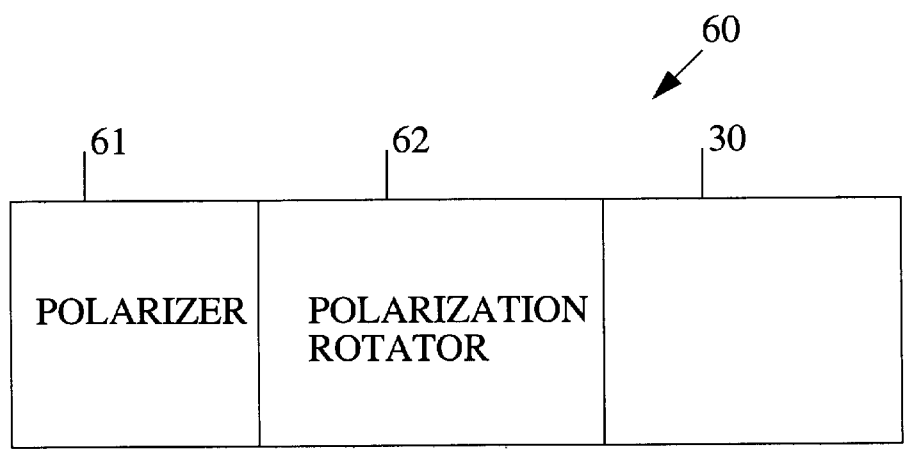
FIG. 6 is an illustration of the device of FIG. 3 with a polarizer and a polarization rotator.

FIG. 6 is a sixth embodiment 60 of the present invention. The sixth embodiment 60 includes a polarizer 61 connected to a polarization rotator 62. The polarization rotator 62 is connected to the dispersion compensator 30 of FIG. 3.

What is claimed is:

1. A device for compensating for dispersion, comprising:
   a) a first spatial-mode converter;
   b) a single-mode optical fiber connected to the first spatial-mode converter, where the single-mode optical fiber consists of a core, and a cladding, where the single-mode optical fiber has a first section of a user-definable length; a second section of a user-definable length that immediately follows the first section, where the second section is tapered at a user-definable rate to a user-definable diameter; a third section of a user-definable length and a user-definable cutoff wavelength that immediately follows the second section, where the third section is a diameter equal to which the second section was tapered; a fourth section of a length equal to the length of the second section, where the fourth section immediately follows the third section, and where the fourth section is tapered at the same, but opposite, rate of the second section to a diameter equal to the diameter of the first section; a fifth section of a length equal to the length of the first section, where the fifth section immediately follows the fourth section; and where the single-mode fiber has a user-definable cutoff wavelength; and
   c) a second spatial-mode converter connected to the fifth section of the single-mode optical fiber.

2. The device of claim 1, wherein said first spatial-mode and said second spatial-mode converter are selected from the group of spatial-mode converters consisting of an acoustic flexural-wave device, a photo-induced grating, and a microbending device.

3. A device for compensating for dispersion, comprising:
   a) a first spatial-mode converter;
   b) a single-mode optical fiber connected to the first spatial-mode converter, where the single-mode optical fiber consists of a core, and a cladding, where the single-mode optical fiber has a first section of a user-definable length having a core-block induced therein; a second section of a user-definable length that immediately follows the first section, where the second section is tapered at a user-definable rate to a user-definable diameter; a third section of a user-definable length and a user-definable cutoff wavelength that immediately follows the second section, where the third section is a diameter equal to which the second section was tapered; a fourth section of a length equal to the length of the second section, where the fourth section immediately follows the third section, and where the fourth section is tapered at the same, but opposite, rate of the second section to a diameter equal to the diameter of the first section; a fifth section of a length equal to the length of the first section, where the fifth section immediately follows the fourth section; and where the single-mode fiber has a user-definable cutoff wavelength; and
   c) a second spatial-mode converter connected to the fifth section of the single-mode optical fiber.

4. The device of claim 3, wherein said first spatial-mode and said second spatial-mode converter are selected from the group of spatial-mode converters consisting of an acoustic flexural-wave device, a photo-induced grating, and a microbending device.

5. A device for compensating for dispersion, comprising:
   a) a polarizer;
   b) a polarization rotator connected to the polarizer; and
   c) a single-mode optical fiber connected to the polarization rotator, where the single-mode optical fiber consists of a core, and a cladding, where the single-mode optical fiber has a first section of a user-definable length; a second section of a user-definable length that immediately follows the first section, where the second section is tapered at a user-definable rate to a user-definable diameter; a third section of a user-definable length and a user-definable cutoff wavelength that immediately follows the second section, where the third section is a diameter equal to which the second section was tapered; a fourth section of a length equal to the length of the second section, where the fourth section immediately follows the third section, and where the fourth section is tapered at the same, but opposite, rate of the second section to a diameter equal to the diameter of the first section; a fifth section of a length equal to the length of the first section, where the fifth section immediately follows the fourth section; and where the single-mode fiber has a user-definable cutoff wavelength.

6. A device for compensating for dispersion, comprising:
   a) a polarizer;
   b) a polarization rotator connected to the polarizer;
   c) a first spatial-mode converter connected to the polarization rotator;
   d) a single-mode optical fiber connected to the first spatial-mode converter, where the single-mode optical fiber consists of a core, and a cladding, where the single-mode optical fiber has a first section of a user-definable length; a second section of a user-definable length that immediately follows the first section, where the second section is tapered at a user-definable rate to a user-definable diameter; a third section of a user-definable length and a user-definable cutoff wavelength that immediately follows the second section, where the third section is a diameter equal to which the second section was tapered; a fourth section of a length equal to the length of the second section, where the fourth section immediately follows the third section, and where the fourth section is tapered at the same, but opposite, rate of the second section to a diameter equal to the diameter of the first section; a fifth section of a length equal to the length of the first section, where the fifth section immediately follows the fourth section; and where the single-mode fiber has a user-definable cutoff wavelength; and e) a second spatial-mode converter connected to the fifth section of the single-mode optical fiber.

7. The device of claim 6, wherein said first spatial-mode and said second spatial-mode converter are selected from the group of spatial-mode converters consisting of an acoustic flexural-wave device, a photo-induced grating, and a microbending device.

8. A device for compensating for dispersion, comprising:

a) a polarizer;

b) a polarization rotator connected to the polarizer;

c) a first spatial-mode converter connected to the polarization rotator;

d) a single-mode optical fiber connected to the first spatial-mode converter, where the single-mode optical fiber consists of a core, and a cladding, where the single-mode optical fiber has a first section of a user-definable length having a core-block induced therein; a second section of a user-definable length that immediately follows the first section, where the second section is tapered at a user-definable rate to a user-definable diameter; a third section of a user-definable length and user-definable cutoff wavelength that immediately follows the second section, where the third section is a diameter equal to which the second section was tapered; a fourth section of a length equal to the length of the second section, where the fourth section immediately follows the third section, and where the fourth section is tapered at the same, but opposite, rate of the second section to a diameter equal to the diameter of the first section; a fifth section of a length equal to the length of the first section, where the fifth section immediately follows the fourth section; and where the single-mode fiber has a user-definable cutoff wavelength; and e) a second spatial-mode converter connected to the fifth section of the single-mode optical fiber.

9. The device of claim 8, wherein said first spatial-mode and said second spatial-mode converter are selected from the group of spatial-mode converters consisting of an acoustic flexural-wave device, a photo-induced grating, and a microbending device.

* * * * *